United States Patent [19]

Shirakuma

[11] Patent Number: 4,635,960
[45] Date of Patent: Jan. 13, 1987

[54] CONTROL SYSTEM FOR HYDRAULIC DAMPERS

[75] Inventor: Takashi Shirakuma, Kanagawa, Japan

[73] Assignee: Tokico Ltd., Kanagawa, Japan

[21] Appl. No.: 785,899

[22] Filed: Oct. 9, 1985

[30] Foreign Application Priority Data

Oct. 19, 1984 [JP] Japan .................................. 59-158033
Oct. 19, 1984 [JP] Japan .................................. 59-158034

[51] Int. Cl.⁴ .............................................. B60G 11/26
[52] U.S. Cl. .................................... 280/707; 188/299; 364/424
[58] Field of Search ............... 280/707, 709, 714; 364/424; 188/299, 1.11, 322.13, 285, 286, 316–318; 267/64.16, 64.17

[56] References Cited

U.S. PATENT DOCUMENTS

| | | | |
|---|---|---|---|
| 3,559,776 | 2/1971 | Schultze | 188/299 |
| 4,313,529 | 2/1982 | Kato et al. | 188/299 |
| 4,463,839 | 8/1984 | Ashiba | 188/318 X |
| 4,466,625 | 8/1984 | Kondo et al. | 280/707 X |
| 4,527,676 | 7/1985 | Emura et al. | 188/299 |
| 4,564,214 | 1/1986 | Tokunaga et al. | 280/707 |
| 4,564,215 | 1/1986 | Kumagai et al. | 280/707 |
| 4,575,115 | 3/1986 | Tatemoto et al. | 280/707 |

*Primary Examiner*—Douglas C. Butler
*Attorney, Agent, or Firm*—Wenderoth, Lind & Ponack

[57] ABSTRACT

A control system for controlling the damping force of a plurality of hydraulic dampers, each of which includes a damping force producing mechanism; a damping force adjustment members for adjusting the effective passage area of an oil passage in the damping force producing mechanism; and an actuator connected to the damping force adjustment member, comprises an indicator circuit for indicating the adjusted and en-route conditions of at least one damping force producing mechanism; an electric power supply circuit for supplying electric power to respective actuators; and the power supply circuit being provided with an inhibiting circuit for inhibiting the supply of power to an actuator associated with a damping force adjustment member which has already been adjusted, through a part of the power supply circuit associated with a damping force adjustment member which has yet not been adjusted.

4 Claims, 8 Drawing Figures

Fig. 1
Fig. 2
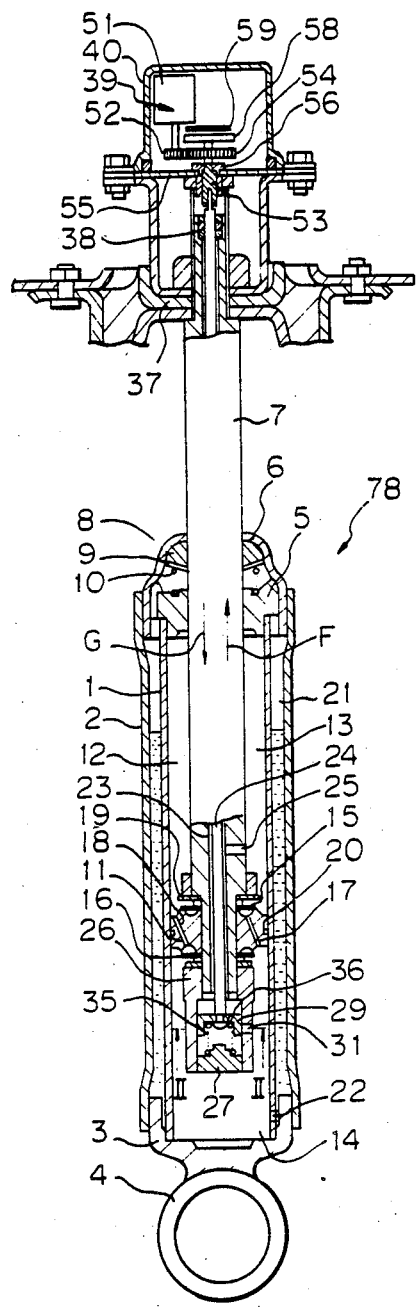
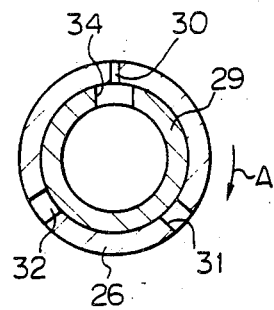

CONTROL SYSTEM FOR HYDRAULIC DAMPERS

BACKGROUND OF THE INVENTION

This invention relates to a hydraulic damper of adjustable damping force type and, particularly, to a control circuit for controlling the damping force of the hydraulic dampers of aforesaid type used in a vehicle.

Various proposals have been made with respect to a hydraulic damper of adjustable damping force type which, when being incorporated on a vehicle such as an automobile, enables to change the damping force in accordance with the driving conditions of the vehicle and conditions of the road thereby improving the comfortableness and safety in driving the vehicle and improving steering property. While, the vehicle is usually incorporated with a plurality of hydraulic dampers corresponding to wheels of the vehicle and, accordingly, in adjusting the damping force of the dampers, it is required to adjust simultaneously the damping force of all hydraulic dampers reliably and to indicate adjusted conditions of respective dampers.

SUMMARY OF THE INVENTION

The present invention has been made in view of aforesaid circumstances and aims to provide a control system for controlling the damping force of a plurality of hydraulic dampers, each of the dampers including a damping force producing mechanism; a damping force adjustment member for adjusting the effective passage area of an oil passage in the damping force producing mechanism; and an actuator connected to the damping force adjustment member, the system comprising an indicator circuit for indicating adjusted and en-route conditions of at least one damping force producing mechanism; an electric power supply circuit for supplying electric power to respective actuators; and the electric power supply circuit being provided with an inhibiting circuit for inhibiting the supply of power to an actuator associated with a damping force adjustment member which has already been adjusted, through a part of the electric power supply circuit associated with a damping force adjustment member which has yet not been adjusted.

According to the present invention, a control system for hydraulic dampers is provided with an indicator circuit for indicating the adjusted and en-route conditions of a damping force producing mechanism, so that the operator can easily comprehend therefrom the operating states of the dampers, and, in particular, can easily distinguish a damping force adjustment operation from the completion thereof.

In addition, according to the present invention, an electric power supply circuit for actuators of the dampers is provided with a circuit for inhibiting the supply of power to an actuator associated with a damping force adjustment member which has already been adjusted, through a part of the power supply circuit associated with a damping force adjustment member which has yet not been adjusted. Any desired force can therefore be reliably applied to each of the hydraulic dampers without malfunctions occurring, even if an asynchronous adjustment is performed.

Further objects and advantages of the invention will become apparent from the following detailed description of some preferred embodiments, with reference to the accompanying drawings.

BRIEF DESCRIPTION OF THE DRAWINGS

FIG. 1 is a longitudinal section through a hydraulic damper to which the control system according to the invention may be applied;

FIG. 2 is a cross section taken along the line II—II in FIG. 1;

DETAILED DESCRIPTION OF THE PREFERRED EMBODIMENTS

Figure 3:
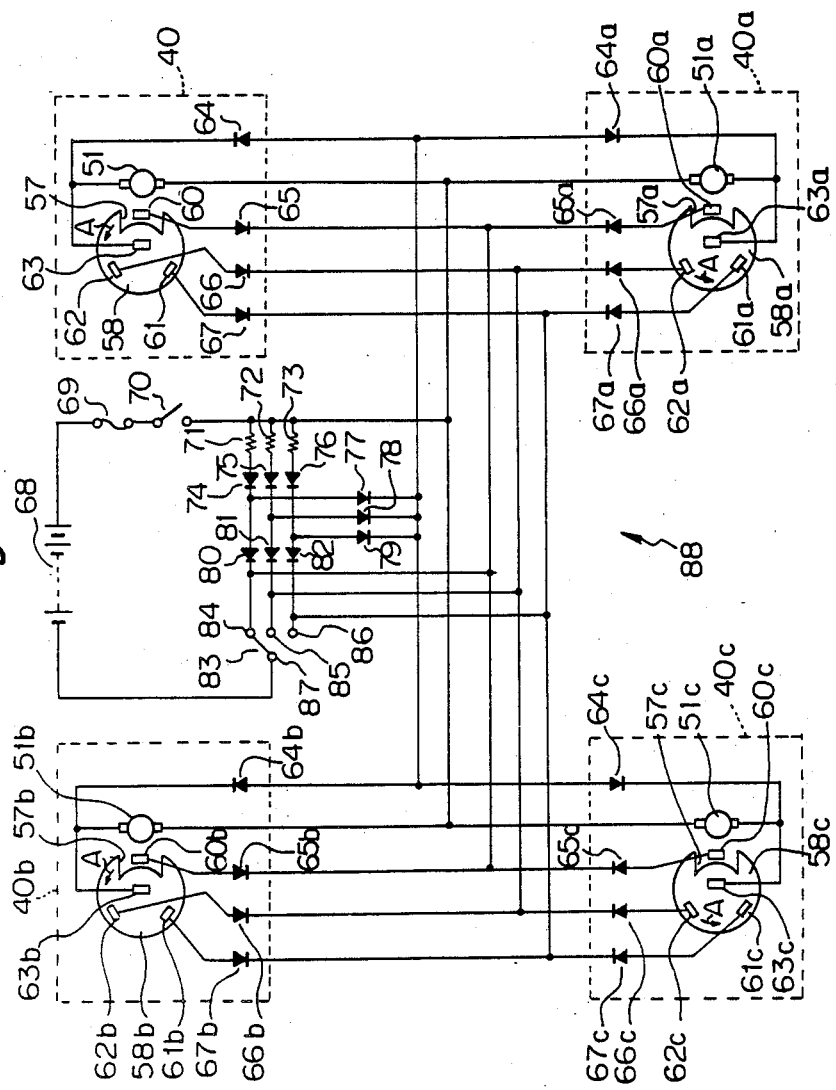
FIG. 3 is a circuit diagram illustrating a first embodiment of the present invention.

FIG. 1 shows a hydraulic damper 78 of adjustable damping force type which comprises an inner tube 1 coaxially surrounded by an outer tube 2, a cap 3 secured to lower ends of the inner and outer tubes 1 and 2, and a mounting ring 4 secured integrally to the cap 3 for mounting the hydraulic damper 78 on such as a wheel axle and the like of a vehicle. A rod guide 5 and a cap 6 are fitted respectively on the upper ends of the inner tube 1 and the outer tube 2. A piston rod 7 slidably extends through the rod guide 5 and the cap 6. A seal 8 and a seal 9 are provided between the cap 6 and the rod guide 5, and the seal 8 is urged against the inner surface of the cap 6 by a spring 10 which acts between the rod guide 5 and the seal 9. The seal 8 sealingly engages with the piston rod 7, and the seal 9 encircles the piston rod 7 and engages with the upper surface of the rod guide 5 to constitute a check valve permitting fluid flow in radially outward direction and preventing the fluid flow in radially inward direction.

A piston 11 is slidably received in the inner tube 1 to partition the interior of the inner tube 1 into two liquid chambers 13 and 14. The piston 11 is connected to the piston rod 7 and has passages 17 and 18 therethrough with one ends of which cooperating with disc valves 15 and 16 respectively. Further, a passage defining a fixed orifice is branched from either of the passages 17 and 18 to permanently communicate with the chambers 13 and 14. The valve 15 opens when the pressure in the chamber 14 is higher than the pressure in the chamber 13 by a predetermined level to permit the liquid flow in the passages 17 (only one of which is shown in FIG. 1) thereby generating a damping force in the contraction stroke of the damper or the movement of the piston rod 7 in an arrow G direction, and closes when the pressure difference between the chambers 14 and 13 is lower than the predetermined level. The valve 16 opens when the pressure in the chambre 13 is higher than the pressure in the chamber 14 by a predetermined level thereby generating a damping force during the extension stroke of the damper. Shown at 19 is a wash, and at 20 is a piston ring.

An annular chamber 21 is defined between inner and outer tubes 1 and 2 and is communicated permanently with the chamber 14 through a radial hole 22 formed in the lower end portion of the inner tube 1. The chambers 13 and 14 and the lower portion of the chamber 21 are filled with hydraulic liquid and pressurized gas is filled in the upper portion of the chamber 21.

A through bore 23 is formed coaxially in the rod 7, and a connecting rod 24 extends rotatably through the bore 23. Further, a tubular member 26 is screw-threadingly connected to the lower end of the rod 7, and the lower end of the tubular member 26 is closed by a cap 27.

A shutter 29 is secured to the lower end of the connecting rod 23 and is rotatably retained in the tubular member 26. The tubular member 26 has in the side wall thereof radial holes 30, 31 and 32 of different diameters at angularly equally spaced relationship of 120° as shown in FIG. 2. When the shutter 29 is rotated through the connecting rod 24, the radial holes 30, 31 and 32 acting as orifices are selectively opened and closed by a hole 34 in the shutter 29. The diameters of the holes 30, 31 and 32 are sequentially increased in the order of 30, 31 and 32. The hole 34 in the shutter 29 extends in the side wall of the shutter 29 by a predetermined width which is larger than the diameter of the largest hole 32 and is smaller than the space between the holes 30, 31 and 32. A spring 35 is disposed between the shutter 29 and the cap 27 to bias the shutter 29 in the upward direction. The shutter 29 further has axial holes 36 having the effective passage area larger than the hole 32. The radial hole 25, the annular space between the bore 23 and the connecting rod 24, the axial hole 36, the hole 34 and any of radial holes 30, 31 and 32 constitute a passage of damping force generating mechanism of the hydraulic damper 78.

The upper end of the piston rod 7 is connected to chassis of the vehicle through a mounting mechanism 37. An O-ring 38 is provided in the upper end portion of the bore 23 to seal the connecting rod 24. A casing 40 of a driving mechanism 39 for rotating the connecting rod 24 and the shutter 29 is mounted on the upper end of the rod 7. A D.C. motor 51 is mounted on the casing 40, and a gear 52 is mounted on the output shaft of the motor 51. The gear 52 meshes with a gear 54 which is secured to a shaft 53, whereby the gears 52 and 54 constitute a reduction gear mechanism. The shaft 53 is connected to the connecting rod 24 and is rotatably supported on a base plate 55 of the casing 40 through a bearing 56.

Referring now to FIG. 3, there is shown a first embodiment of the present invention.

A conductive disc 58 having a notch 57 is secured to the shaft 53 and a brush-fitting plate 59 is supported on the casing 40 against the surface of the disc 58. Brushes 60, 61 and 62 are provided on the fitting plate 59 at intervals of about 120° in the peripheral direction, and the brushes electrically contact the disc 58 if they do not face the notch. The fitting plate 59 is also provided with a brush 63 which always electrically contacts the disc 58, independently of the position of the notch 57. The brush 63 is electrically connected to both one end of the motor 51 and one element of the diode 64, the brush 60 is connected to one element of the diode 65, the brush 62 is connected to one element of the diode 66, and the brush 61 is connected to one element of the diode 67. The motor 51, the disc 58, the hydraulic damper 78 and the associated elements, which are contained in the casing 40, are provided for each of the wheels of the vehicle. It must be noted that the same numbers are used to designate similar elements and the characters a, b and c are labelled to the numbers so as to distinguish the elements associated with the respective wheels thereamong. One terminal of the D.C. power source 68 is connected to one terminals of the respective motors 51, 51a, 51b and 51c and one terminals of the respective resistors 71, 72 and 73 through the fuse 69 and the switch 70, the other terminals of the respective resistors 71, 72 and 73 are connected to one elements of the respective diodes 77, 78 and 79 and one elements of the respective diodes 80, 81 and 82 through the light-emitting diodes 74, 75 and 76, and the other elements of the respective diodes 77, 78 and 79 are connected to the other elements of the respective diodes 64, 64a, 64b and 64c. The other elements of the diodes 80, 81 and 82 are respectively connected to the fixed contacts 84, 85 and 86 of the damping-force selector switch 83, and are respectively connected to one terminals of the diodes 65, 65a, 65b and 65c, the diodes 66, 66a, 66b and 66c, and the diodes 67, 67a, 67b and 67c. The movable contact 87 of the switch 83 is connected to the other terminal of the power source 68. In the electric power supply circuit 88 shown in FIG. 3, the resistors 71, 72 and 73, the light-emitting diodes 74, 75 and 76, and the diodes 77, 78 and 79 form an indicator circuit, and the diodes 80, 81 and 82, the diodes 64, 64a, 64b and 64c, the diodes 65, 65a, 65b and 65c, and the diodes 66, 66a, 66b and 66c form a inhibiting circuit for inhibiting the supply of power to an actuator associated with a damping force adjustment member. The switches 70 and 83, and the diodes 74, 75 an 76 acting as the indicator elements are operably and visually provided on the dashboard of the vehicle.

In the operation of the damping force adjustment mechanism described above, if the switch 70 is turned on, the movable contact 87 of the switch 83 is connected to the contact 84 thereof, and the notch 57 is positioned as shown in the drawing, the brush 60 and the disc 58 are not in contact and all of the diodes 64, 77, 78 and 79 are reverse-biased, so that the current from the power source 68 is not supplied to the motor 51; the gears 52 and 54, the shaft 53, the connecting rod 24, and the shutter 29 remain stopped; the hole 34 is aligned with the hole 30; and the chamber 13 communicates with the chamber 14 through the holes 25, 23, 36, 34 and 30. Thus, the movement of the piston 11 in a extended or F direction causes the shock absorber or the hydraulic damper 78 to produce a damping force determined by the fixed orifice, the valve 16, and the hole 30 which are formed in the piston 11. In this case, the hardest damping force can be obtained because the diameter of the hole 30 is smaller than those of the holes 31 and 32. The movement of the piston 11 in a contracted or G direction also causes the damper 78 to produce the hardest damping force. In this condition, only the diode 74 is allowed to pass a current therethrough and emit light therefrom, the current being limited by the resistor 71. It can be understood, therefore, the damper 78 is designed to produce the hardest damping force when the diode 74 emits light.

On the other hand, if the switch 87 is operated to bring the movable contact 87 into contact with a contact 85, the current from the power source 68 flows through the motor 51, the brush 63, the disc 58, the brush 62, and the diode 66 to energize the motor 51 so that the gears 52 and 54 are rotated, and hence the disc 58 is rotated in an A direction. Thus, if the notch 57 is rotated to a position facing the brush 62, the disc 58 and the brush 62 are not in contact, thereby interrupting the current supply from the power source 68 to the motor 51 so as to stop the rotation thereof. Since the shutter 29 also is rotated in response to the rotation of the gear 54 in the A direction, when the notch 57 faces the brush 62, the hole 34 is forced into alignment with the hole 31, and the chamber 13 communicates with the chamber 14 through the holes 25, 23, 36, 34 and 31. As a result, the movement of the piston 11 in both the F and G directions causes the hydraulic damper 78 to produce an intermediate damping force, because the diameter of the hole 31 is larger than that of the hole 30. From the time when the contact 87 is in contact with the contact 85 to the time when the notch 57 faces the brush 62, and the brush 62 and the disc 58 are placed out of contact, the current, which is limited by the resistors 71 and 73, flows through the diodes 74 and 76, and the diodes 77, 79 and 64 so that all of the diodes 74, 75 and 76 emit light. As a result, it can be recognized that the adjusting operation is currently functioning. After that, because the current limited by the resistor 72 flows through only the diode 75, causing it to emit light, it can be recognized that the adjusting operation is completed. As is understood, the indicator circuit is constructed to operate between two states so that the adjusting operation can be distinguished from the completion thereof.

If the switch 87 is operated to bring the movable contact 87 into contact with a contact 86, the operation can be explained in the same manner.

The operation of the circuit shown in FIG. 3 has been explained above, in which the rotations of all of the discs 58, 58a, 58b and 58c are mutually synchronized, and the contacting or non-contacting actions between the notches 57, 57a, 57b and 57c and the corresponding brushes are also mutually synchronized for all of the wheels.

When, in order to obtain a relatively hard damping force, for example, the notches 57, 57b and 57c of the discs 58, 58b and 58c, respectively, have been made to face the brushes 60, 60b and 60c, respectively, but the notch 57a has not yet reached the brush 60a after the positioning of the switch 87 as shown in FIG. 3, if the diode 81 were not provided, the current from the power source 68 would flow through the motor 51, the brush 63, the disc 58, the brush 62, the diodes 66 and 78, the diode 64a, the brush 63a, the disc 58a, the brush 60a, the diode 65a, and the switch 83 in sequence, so that the motor 51 and hence the disc 58 would still be rotated, despite the completion of the adjustment operation. This means that the diode 81 functions to inhibit this current, as well as the diodes 80 and 82. Furthermore, in the condition described above, if the diode 64 were not provided, the current from the power source 68 would flow through the motor 51, the diode 64a, the brush 63a, the disc 58a, the brush 60a, the diode 65a, and the switch 83, and therefore the motor 51 would still be driven and hence the disc 58 would still be rotated, despite the completion of the adjustment operation. This similarly means that the diodes 64, 64a, 64b and 64c function to inhibit this current, as well as the diodes 65, 65a, 65b and 65c; the diodes 66, 66a, 66b and 66c; and the diodes 67, 67a, 67b and 67c.

Figure 4:
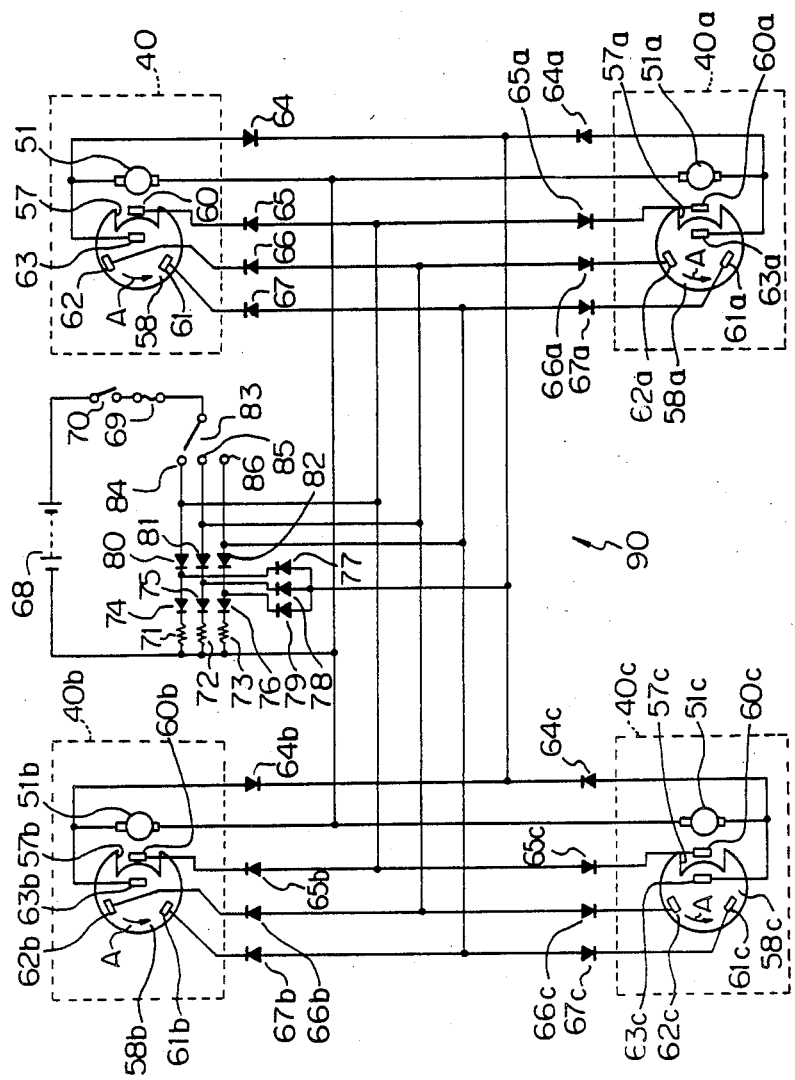
FIG. 4 is a circuit diagram illustrating a second embodiment of the present invention.

Although the switch 83 is provided on the negative side of the power source 68 in the embodiment described above, the switch 83 may be provided on the positive side of the power source 68, and a power supply circuit 90 similar to the power supply circuit 88 may be formed, as shown in FIG. 4 which discloses a second embodiment of the present invention.

Figure 5:
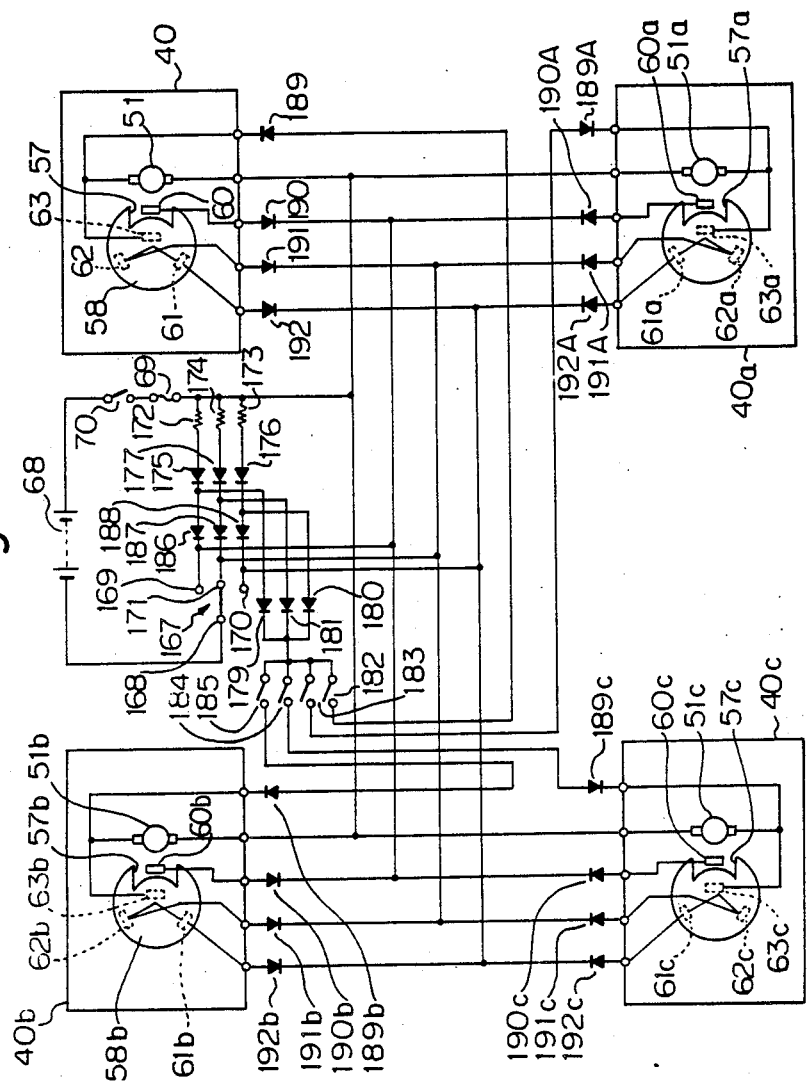
FIG. 5 is a circuit diagram illustrating a third embodiment of the present invention.

Referring now to FIG. 5, there is shown a third embodiment of the present invention.

As described with respect to FIG. 3, the conductive disc 58 having a notch 57 is secured to the shaft 53 and the brush-fitting plate 59 is supported on the casing 40 against the surface of the disc 58. The brushes 60, 61 and 62 are provided on the fitting plate 59 at intervals of about 120° in the peripheral direction, and the brushes electrically contact the disc 58 if they do not face the notch. The fitting plate 59 is also provided with the brush 63 which always electrically contacts the disc 58, independently of the position of the notch 57. The brush 63 is electrically connected to one terminal of the motor 51, the other terminal of which is electrically connected to one terminal of the D.C. power source 68 through the fuse 69 and the switch 70. The indicator circuit comprising resistors 172, 173 and 174 and light-emitting diodes 175, 176 and 177 is inserted between contacts 169, 170 and 171, respectively, and one terminal of the D.C. power source 68. In addition, the indicator circuit has diodes 179, 180 and 181 connected together to selector switches 182, 183, 184 and 185 which act as four selector circuits. The selector switches 182, 183, 184 and 185 are respectively connected to the motors associated with the systems corresponding to the wheels. The switches 70, 167, 182, 183, 184 and 185, and the diodes 175, 176 and 177 acting as indicator elements, are provided on the dashboard of the vehicle on which the hydraulic dampers are provided.

In the operation of the damping force adjustment mechanism described above, if both the switch 70 and the selector switch 182 are on and a movable contact 168 of a switch 167 is connected to a contact 169, the brush 60 and the disc 58 are not in contact and the diode 179 is reverse-biased, so that the current from the power source 68 is not supplied to the motor 51; the gears 52, 54, the shaft 53, the connecting rod 24, and the shutter 29 remain stopped; the hole 34 is aligned with the hole 30; and the chamber 13 communicates with the chamber 14 through the holes 25, 23, 36, 34 and 30. Thus, the movement of the piston 11 in the stretched or F direction causes the shock absorber or the hydraulic damper 78 to produce a damping force determined by the fixed orifice, the valve 16, and the hole 30 which are formed in the piston 11. In this case, the hardest damping force can be obtained because the diameter of the hole 30 is smaller than those of the holes 31 and 32.

In this condition, only the diode 175 is allowed to pass a current therethrough and emit light therefrom. It can be understood, therefore, that the damper 78 is designed to produce the hardest damping force when the diode 175 emits light.

On the other hand, if the switch 67 is operated to bring the movable contact 68 into contact with a contact 171, the current from the power source 68 flows through the motor 51, the brush 63, the disc 58 and the brush 62 to energize the motor 51 so that the gears 52 and 54 are rotated, and hence the disc 58 is rotated. Thus, if the notch 57 of the disc 58 is rotated to a position facing the brush 62, the disc 58 and the brush 62 are not in contact, thus interrupting the current supply from the power source 68 to the motor 51 and thereby stopping the rotation thereof. Since the shutter 29 also is rotated in response to the rotation of the gear 54, when the notch 57 faces the brush 62, as described above, the hole 34 is forced into alignment with the hole 31, and the chamber 13 communicates with the chamber 14 through the holes 25, 23, 36, 34 and 31. As a result, the movement of the piston 11 in both the F and G directions causes the shock absorber 78 to produce an intermediate damping force because the diameter of the hole 31 is larger than that of the hole 30. From the time when the contact 168 is in contact with the contact 171 to the time when the brush 62 and the disc 58 are placed out of contact by means of the notch 57, the current flows through the diodes 179, 180 and the selector switch 182 so that all of the diodes 175, 176 and 177 emit light. As a result, it can be recognized that the adjusting operation is currently functioning. After that, because the current flows through only the diode 177, causing it to emit light, it can be recognized that the adjusting operation is completed and the circuit including the contact 171 which is associated with the line of the switch 182 is normally operated.

In order to detect any defects in the hydraulic damper systems, the selector switches 182 through 185 are turned on one by one and the movable contact 168 is switched to select any one of the contacts 169, 171 and 170, as described above. The normally-functioning condition can be comprehended by confirming the change from the simultaneously light-emitting state of all of the display elements to the light-emitting state of the element associated with the selected contact. In contrast, the presence of a malfunction condition in the systems can be comprehended by confirming that, if the damping adjusting member is locked or is continuously rotating, the three diodes 175, 176 and 177 keep on emitting light because the break in contact between one of the brushes and the disc 58 does not occur. Alternatively, if a wire breakage or the like occurs in any of the system lines, the associated diode fails to emit light.

Under ordinary circumstancies, all of the selector switches are turned on and, if a defect occurs in the systems, the light-emitting state should develop into an unusual situation. Therefore, in order to detect such a defect, the selector switches are operated one by one.

Figure 6:
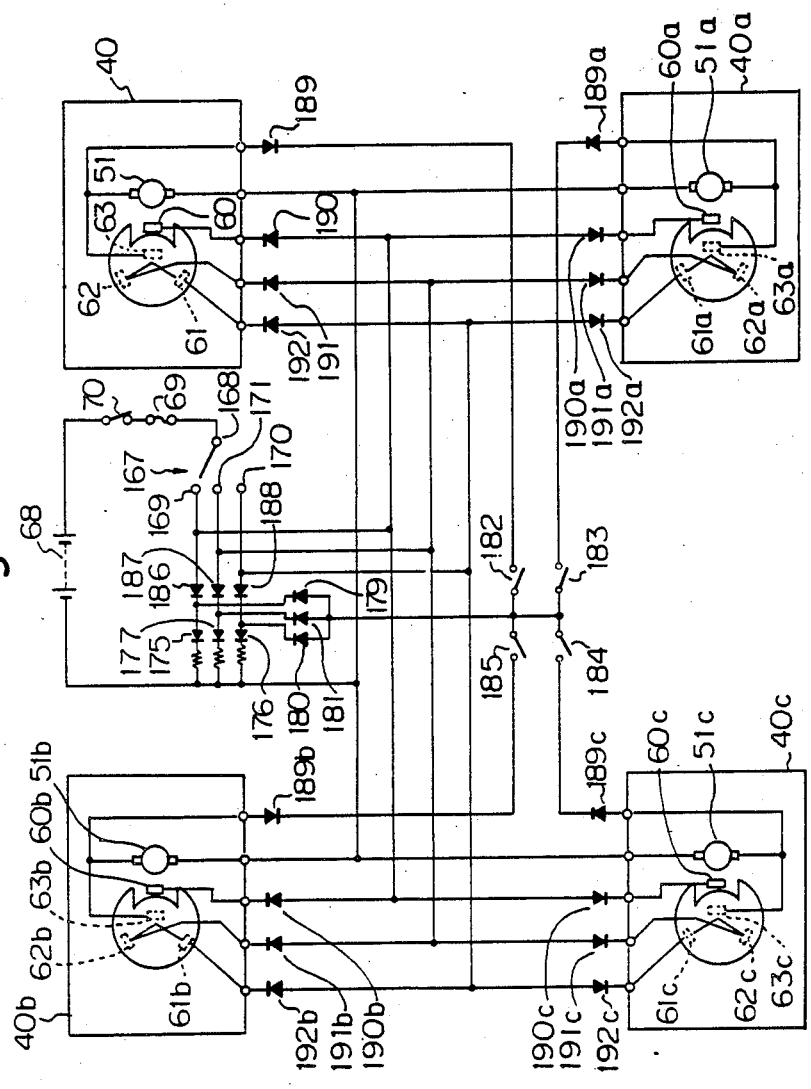
FIG. 6 is a circuit diagram illustrating a fourth embodiment of the present invention.

FIG. 6 shows a fourth embodiment of the present invention.

If the switch 167 is operated to move the movable contact 168 from the contact 169 to the contact 171 and bring it into contact with the contact 171, the current from the power source 68 flows through the brushes 62, 63, the disc 58 and the motor 51 to energize the motor, so that the gears 52 and 54 are rotated to bring the notch of the disc 58 out of contact with the brush 62. Thus, this operation causes the shock absorber 78 to produce the intermediate damping force. Before that time, that is, before the notch 57 of the disc 58 comes out of contact with brush 62, all of the diodes 175, 176 and 177 emit light, and it can be comprehended, therefore, that the adjusting operation is functioning. After that, when the notch 57 of the disc 58 reaches the out of contact position, only the diode 177 is allowed to emit light, because the circuit including the diode 189, the selector switch 182, the diodes 179, 181 and 180 is non-conducting. The operation for detecting a defect in one of the systems can be effected in the same manner as the third embodiment shown in FIG. 5. The operations of the remaining systems can be similarly effected by selecting the selector switches 183, 184 and 185. It must be noted that, in the drawings, the same numbers are used to designate similar elements.

Figure 7:
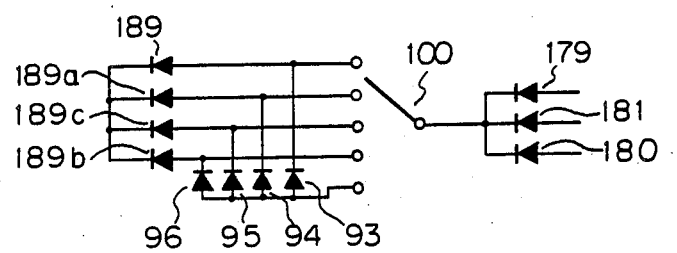
FIG. 7 is a circuit diagram in which a rotary switch is used instead of the selector switches shown in FIGS. 5 and 6.

FIG. 7 shows a circuit in which a rotary switch 100 is used instead of the selector switches.

Figure 8:
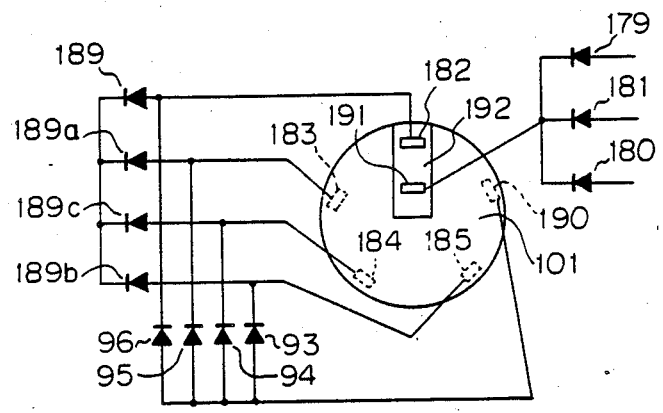
FIG. 8 is a circuit diagram in which a pattern switch is used instead of the selector switches shown in FIGS. 5 and 6.

FIG. 8 shows a circuit in which a pattern switch 101 is used instead of the selector switches. In this embodiment, the pattern switch 101 has the conductor 192 and the systems are each operated by selecting the conductor 192 and any one of the brushes 182, 183, 184 and 185. The other operations are the same as those of the third embodiment.

Although the preferred embodiments have been described in detail herein, it will be apparent to those skilled in the art that numerous modifications and substitutions may be made within the scope of the invention. In particular, although the embodiments above are explained with respect to the light-emitting diodes acting as the indicator elements of the circuit, it will now be apparent that incandescent lamps may be utilized as the indicator elements. In addition, it will now be apparent that the hydraulic damper of the present invention may be applied to each of the shafts of the vehicle.

What is claimed is:

1. A control system for controlling the damping force of a plurality of hydraulic dampers, each of said dampers including a damping force producing mechanism; a damping force adjustment member for adjusting the effective passage area of an oil passage in the damping force producing mechanism; and an actuator connected to the damping force adjustment member, said system characterized by comprising:

an indicator circuit for indicating the adjusted and en-route conditions of at least one damping force producing mechanism;

an electric power supply circuit for supplying electric power to respective actuators; and said power supply circuit being provided with an inhibiting circuit for inhibiting the supply of power to an actuator associated with a damping force adjustment member which has already been adjusted, through a part of the power supply circuit associated with a damping force adjustment member which has yet not been adjusted.

2. The control system according to claim 1, wherein said indicator circuit includes a selector circuit for selecting any one of said plurality of hydraulic dampers.

3. The control system according to claim 2, wherein said selector circuit comprises a rotary switch having at least four contacts.

4. The control system according to claim 2, wherein said selector circuit comprises a pattern switch having at least four contacts.

* * * * *